United States Patent
Koo et al.

(10) Patent No.: US 6,748,971 B2
(45) Date of Patent: Jun. 15, 2004

(54) DISCHARGE VALVE ASSEMBLY OF FLUID MACHINERY

(75) Inventors: In-Hwe Koo, Yoingin (KR); Young-Il Chang, Seoul (KR)

(73) Assignee: LG Electronics, Inc., Seoul (KR)

( * ) Notice: Subject to any disclaimer, the term of this patent is extended or adjusted under 35 U.S.C. 154(b) by 115 days.

(21) Appl. No.: 10/170,544

(22) Filed: Jun. 14, 2002

(65) Prior Publication Data

US 2003/0070712 A1 Apr. 17, 2003

(30) Foreign Application Priority Data

Aug. 31, 2001 (KR) ........................................ 2001-53429

(51) Int. Cl.[7] .............................................. F16K 15/02
(52) U.S. Cl. ........................ 137/496; 251/64; 417/559
(58) Field of Search ................................ 137/496, 495; 251/64; 417/559

(56) References Cited

U.S. PATENT DOCUMENTS

| | | | | |
|---|---|---|---|---|
| 644,422 A | * | 2/1900 | Greenwood | 137/243 |
| 2,861,520 A | * | 11/1958 | Lindsey | 417/559 |
| 3,134,394 A | * | 5/1964 | Tsunetaro | 137/220 |
| 4,256,137 A | * | 3/1981 | de Launay | 137/496 |
| 4,522,230 A | * | 6/1985 | Clapper et al. | 137/496 |
| 5,390,698 A | * | 2/1995 | Frazzini | 137/496 |
| 6,102,682 A | * | 8/2000 | Kim | 418/63 |

* cited by examiner

Primary Examiner—Stephen M. Hepperle
(74) Attorney, Agent, or Firm—Birch, Stewart, Kolasch & Birch, LLP

(57) ABSTRACT

A discharge valve assembly of fluid machinery is provided. The discharge valve assembly of fluid machinery includes a valve housing connected to a discharge side of a compression chamber, forming a valve holding space for holding a valve, forming a discharge hole on one side of the valve holding space, forming a back current hole in the other side of the valve holding space to be separated from the discharge hole, and fixedly installed in a discharge chamber, and a sliding valve positioned between the discharge side of the compression chamber and the discharge hole of the valve housing so as to open and close the discharge hole while sliding according to the pressure of the compression chamber and the pressure of the discharge chamber and inserted into the valve holding space to slide. The sliding valve completely opens the discharge side of the compression chamber and the discharge hole of the valve housing when compressed refrigerant gas is discharged. Accordingly, it is possible to significantly reduce fluid resistance. Because the discharge of the compressed refrigerant gas is restricted while the valve slides, the reaction speed of the valve becomes high. Accordingly, it is possible to effectively prevent the discharge gas from back flowing and to effectively reduce collision noise between the valve and the valve housing.

4 Claims, 3 Drawing Sheets

DISCHARGE VALVE ASSEMBLY OF FLUID MACHINERY

BACKGROUND OF THE INVENTION

1. Field of the Invention

The present invention relates to a discharge valve assembly for restricting the discharge of compressed fluid in fluid machinery, and more particularly, to a discharge valve assembly of fluid machinery opened and closed in a sliding method, the discharge valve assembly for reducing fluid resistance during discharge of fluid and preventing back current of the discharged fluid.

2. Description of the Background Art

In general, fluid machinery sucks up fluid into a cylinder, compresses the fluid, and discharges the compressed fluid using a rotary motion or a linear motion of a piston combined with a driving motor. A discharge valve assembly for controlling discharge of fluid is included in the cylinder of the fluid machinery in almost cases.

A widely known discharge valve assembly includes a reed valve as shown in FIG. 1 and a piston valve as shown in FIG. 2.

The reed valve is formed so that one side end of a rectangular reed valve 1 is fixed to a cylinder or a valve plate 2 and that the other end that is a free end faces a discharge opening 2a formed on one side surface of the cylinder or the valve plate 2, to thus control discharge of the compressed fluid.

A retainer 3 for restricting the movement of the reed valve 1 is fixed to and combined with the reed valve 1 on the reed valve 1.

As shown in FIG. 2, the piston valve is formed so that a discharge opening 5a is formed on one side surface of the cylinder or a valve plate 5. A piston valve 4 having a predetermined weight is positioned above the discharge opening 5a.

A valve housing 6 having an inner circumference slightly larger than the outer circumference of the piston valve 4 inside thereof so as to include the piston valve 4 and including a back current hole 6b formed on one side thereof for closing of the valve is fixedly combined with the one side surface of the cylinder or the valve plate 5 by a predetermined means such as a bolt.

However, the reed valve 1 has a shortcoming of causing valve noise while the reed valve 1 is opened and closed when a pressure ratio increases together with loss due to fluid resistance when fluid is discharged because the valve closes the discharge opening 2a.

Also, in the piston valve 4, because the compressed fluid must be discharged while moving the heavy valve 4 upward, the fluid resistance is significant during the discharge of the compressed fluid. In particular, during a high-pressure ratio operation, while the piston valve 4 does not smoothly prevent the back current of the compressed fluid, loss due to the back current occurs. Also, during an abnormal operation, the piston valve 4 generates valve noise while going up and down in the valve housing 6 fixed to the cylinder or the valve plate 5.

SUMMARY OF THE INVENTION

Therefore, an object of the present invention is to provide a discharge valve assembly of fluid machinery, which is capable of reducing fluid resistance, reducing noise, and effectively preventing back current of fluid during the discharge of compressed refrigerant gas.

To achieve these and other advantages and in accordance with the purposes of the present invention, as embodied and broadly described herein, there is provided a discharge valve assembly of fluid machinery, comprising a valve housing connected to a discharge side of a compression chamber, forming a valve holding space for holding a valve, forming a discharge hole on one side of the valve holding space, forming a back current hole in the other side of the valve holding space to be separated from the discharge hole, and fixedly installed in a discharge chamber, and a sliding valve positioned between the discharge side of the compression chamber and the discharge hole of the valve housing so as to open and close the discharge hole while sliding according to the pressure of the compression chamber and the pressure of the discharge chamber and inserted into the valve holding space to slide.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

A discharge valve assembly of fluid machinery according to the present invention will now be described in detail with reference to an embodiment shown in the attached drawings.

Figure 1:
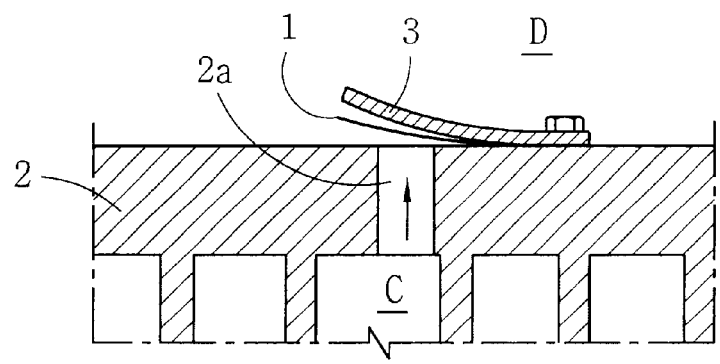
FIG. 1 is a vertical sectional view schematically showing an example of a discharge valve assembly of conventional fluid machinery.
Figure 2:
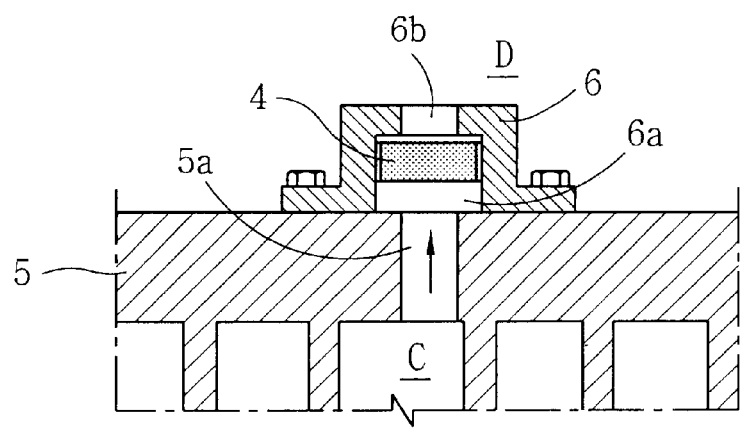
FIG. 2 is a sectional view schematically showing another embodiment of the discharge valve assembly of the conventional fluid machinery.
Figure 3:
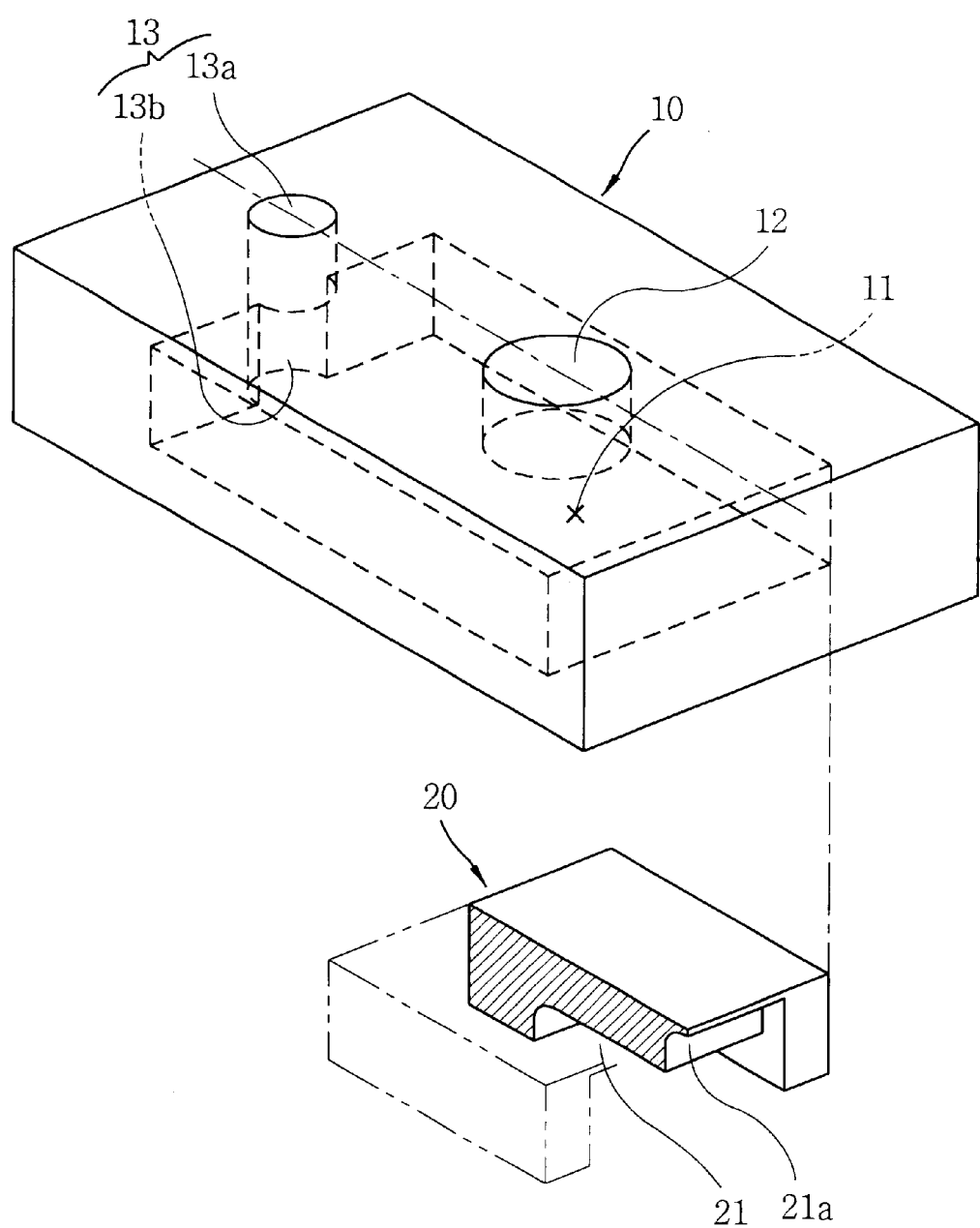
FIG. 3 is an exploded perspective view showing the broken discharge valve assembly of the fluid machinery according to the present invention.
Figure 4:
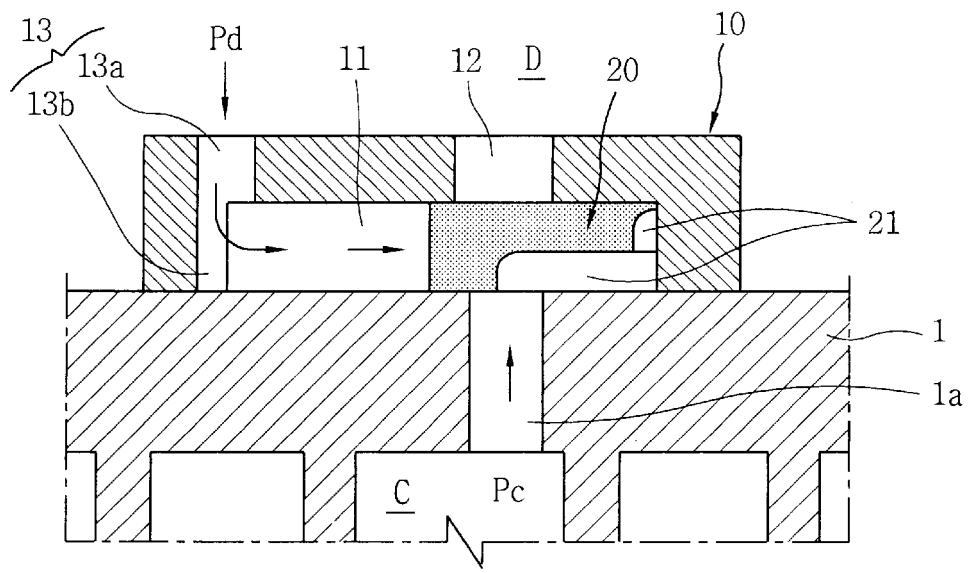
FIG. 4 is a vertical sectional view showing the operation of the discharge valve assembly of the fluid machinery according to the present invention.
Figure 5:
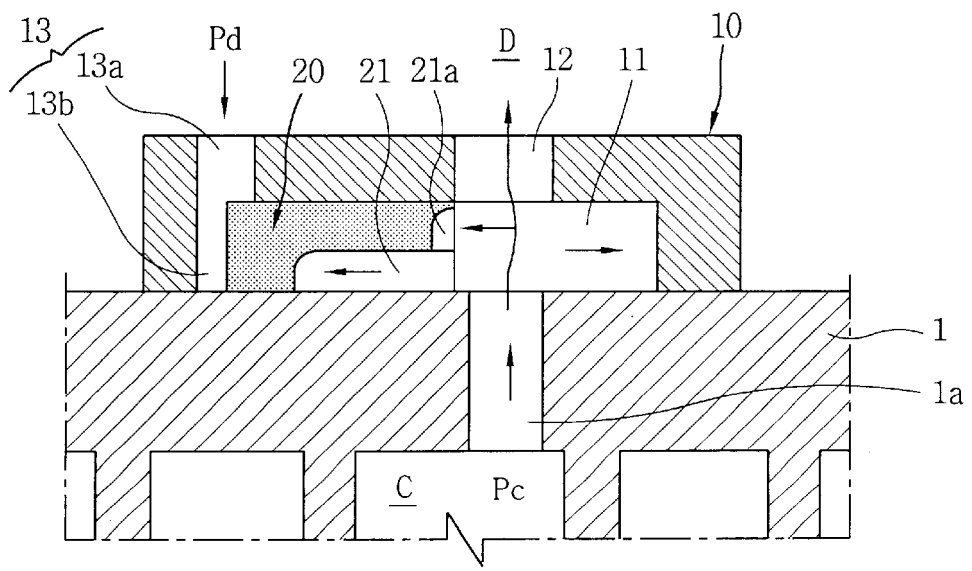
FIG. 5 is a vertical sectional view showing the operation of the discharge valve assembly of the fluid machinery according to the present invention.

FIG. 3 is an exploded perspective view showing a broken discharge valve assembly of fluid machinery according to the present invention. FIGS. 4 and 5 are vertical sectional views showing the operations of the discharge valve assembly of fluid machinery according to the present invention.

As shown in FIGS. 3 through 5, the discharge valve assembly of the fluid machinery according to the present invention includes a valve housing 10 fixedly installed in the leading end of a cylinder or the leading end of a valve plate 1 so as to be connected to a discharge opening 1a of a compression chamber C and a sliding valve 20 held inside the valve housing 10, the sliding valve 20 for opening and closing the discharge opening 1a while sliding due to difference in the pressure Pd of a discharge chamber D and the pressure Pc of the compression chamber C.

The valve housing 10 has a ⊓-shaped section when a front view is taken so as to include a valve holding space 11 connected to the discharge opening 1a on a surface contacting the cylinder or the valve plate 1. A discharge hole 12 and a back current hole 13 connected to the valve holding space 11 are formed to be separated from each other on the upper surface of the valve housing 10.

The discharge hole 12 and the back current hole 13 are preferably formed to be separated from each other by a predetermined distance so that either the discharge hole 12 or the back current hole 13 overlaps the sliding valve 20 in a movement range of the sliding valve 20.

The discharge hole 12 is arranged on the same perpendicular line as the cylinder or the discharge opening 1a of the valve plate 1 in consideration of the fluid resistance during the discharge of the compressed gas and is preferably formed to be larger than the diameter of the discharge opening 1a.

The back current hole 13 includes a penetrating unit 13a penetrating the valve holding space 11 and a groove 13b formed by shaping on the side surface of the valve holding space 11 to be connected to the penetrating unit 13a.

The penetrating unit 13a faces the plane of the sliding valve 20. And, the groove 13b is formed on one surface of the valve housing 10 so as to face the one surface of the sliding valve 20.

The groove 13b can be formed on one surface of the sliding valve 20 so as to be included in the above back current hole 13.

The sliding valve 20 has ⊓-shaped section when a front view is taken so that a discharge channel groove 21 and an additional discharge channel groove 21a always connected to the cylinder or the discharge opening 1a of the valve plate 1 are included on a surface contacting the cylinder or the valve plate 1.

The discharge channel groove 21 and the additional discharge channel groove 21a are formed to be a straight line, a diagonal line, or a curved line so as to face from the center of the bottom of the sliding valve 20 to the opposite side of the back current hole 13 of the valve housing 10.

A buffering member (not shown) can be loaded on either the valve housing 10 or the sliding valve 20 or on both side surfaces in order to prevent collision noise on both side surfaces of the valve holding space 11 of the valve housing 10 and on forward and backward surfaces of the sliding valve 20 corresponding to both side surfaces of the valve holding space 11 of the valve housing 10, that is, on a contact surface between the valve housing 10 and the sliding valve 20.

The operation and the effect of the discharge valve assembly of the fluid machinery according to the present invention will now be described.

As shown in FIG. 4, when the pressure Pc of the compression chamber C is higher than the pressure of the discharge chamber D, the compressed gas discharged through the discharge opening 1a of the compression chamber C is induced to the backward of the valve along the discharge channel groove 21 of the sliding valve 20. While the compressed gas induced to the backward of the valve 20 increases, the sliding valve 20 is pushed by repulsive force with respect to the side surface of the valve holding space 11. While the sliding valve 20 is pushed to the opposite side of the valve holding space 11 of the valve housing 10, the discharge hole 12 is opened. Accordingly, the compressed gas discharged from the compression chamber C is smoothly discharged to the discharge chamber D.

As shown in FIG. 5, when the pressure Pc of the compression chamber C is lower than the pressure Pd of the discharge chamber D because the compressor stops or is over-vacuum or over-compression driven, some of the compressed refrigerant gas discharged to the discharge chamber D flows into the penetrating unit 13a and the groove 13b of the back current hole 13. The compressed refrigerant gas pushes the sliding valve 20 by the repulsive force. The sliding valve 20 is pushed backward because the pressure Pc of the compression chamber C is larger than the pressure Pd of the discharge chamber D. Accordingly, the sliding valve 20 intercepts the discharge hole 12, the back current hole 13, and the discharge opening 1a of the compression chamber C to thus prevents the discharged compressed gas from back flows to the compression chamber C.

The sliding valve restricts the discharge of the compressed gas while smoothly sliding in the valve holding space of the valve housing according to difference between the pressure of the compression chamber and the pressure of the discharge chamber. Because the discharge opening of the compression chamber and the discharge hole of the valve housing are positioned on the same perpendicular line, the fluid resistance is significantly reduced. Accordingly, it is possible to improve the performance of the compressor.

Also, because the reaction speed of the valve is high, it is possible to effectively prevent the discharged gas from back flowing. Also, a sliding motion is performed when the valve is opened and closed. The discharge gas or the compressed gas performs a buffering function on forward and backward sides. A buffering member is added on both surfaces. Accordingly, it is possible to effectively reduce collision noise of the valve.

The discharge valve assembly of the fluid machinery according to the present invention includes the valve housing including the valve holding space and the sliding valve restricting the discharge of the compressed gas while sliding inside the valve holding space. Accordingly, the sliding valve can completely open the discharge side of the compression chamber and the discharge hole of the valve housing when the compressed refrigerant gas is discharged. Therefore, it is possible to significantly reduce the fluid resistance.

Also, because the valve restricts the discharge of the compressed gas while sliding, the reaction speed of the valve becomes higher. Accordingly, it is possible to effectively prevent the discharge gas from back flowing and to effectively reduce collision noise between the valve and the valve housing.

What is claimed is:

1. A discharge valve assembly of fluid machinery, comprising:
   a valve housing connected to a discharge side of a compression chamber, forming a valve holding space for holding a valve, forming a discharge hole on one side of the valve holding space, forming a back current hole in the other side of the valve holding space to be separated from the discharge hole, and fixedly installed in a discharge chamber; and
   a sliding valve positioned between the discharge side of the compression chamber and the discharge hole of the valve housing so as to open and close the discharge hole while sliding according to the pressure of the compression chamber and the pressure of the discharge chamber and inserted into the valve holding space to slide.

2. The discharge valve assembly of claim 1, wherein the back current hole of the valve housing comprises:

a penetrating unit penetratingly formed so as to correspond to the plane of the sliding valve; and a groove formed by shaping on one surface of the valve housing contacting the valve holding space to be connected to the penetrating unit so as to correspond to one surface of the sliding valve.

3. The discharge valve assembly of claim 1, wherein the sliding valve comprises a discharge channel groove and an additional discharge channel groove always connected to the discharge side of the compression chamber on a surface contacting the discharge side of the compression chamber so that fluid discharged from the compression chamber moves the body of the sliding valve to an opening direction.

4. The discharge valve assembly of claim 1, wherein a buffering member for reducing collision noise is loaded on one surface of the valve housing contacting the valve holding space or on the surface, to which the sliding valve is attached and from which the sliding valve is detached, corresponding to one surface of the valve housing.

* * * * *